US011853556B2

(12) United States Patent
Kientz et al.

(10) Patent No.: US 11,853,556 B2
(45) Date of Patent: *Dec. 26, 2023

(54) COMBINING SETS OF MEMORY BLOCKS IN A MEMORY DEVICE

(71) Applicant: Micron Technology, Inc., Boise, ID (US)

(72) Inventors: Steven Michael Kientz, Westminster, CO (US); Larry J. Koudele, Erie, CO (US); Shane Nowell, Boise, ID (US); Michael Sheperek, Longmont, CO (US); Bruce A. Liikanen, Berthoud, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,842

(22) Filed: Jun. 6, 2022

(65) Prior Publication Data

US 2022/0300166 A1    Sep. 22, 2022

Related U.S. Application Data

(63) Continuation of application No. 17/103,441, filed on Nov. 24, 2020, now Pat. No. 11,354,043.

(51) Int. Cl.
*G06F 3/06* (2006.01)
*G06F 11/30* (2006.01)

(52) U.S. Cl.
CPC ............ *G06F 3/0614* (2013.01); *G06F 3/064* (2013.01); *G06F 3/0631* (2013.01); *G06F 3/0659* (2013.01); *G06F 3/0679* (2013.01); *G06F 11/3037* (2013.01); *G06F 11/3058* (2013.01)

(58) Field of Classification Search
None
See application file for complete search history.

(56) References Cited

U.S. PATENT DOCUMENTS

| | | |
|---|---|---|
| 11,222,704 B1 | 1/2022 | Rayaprolu |
| 2007/0101095 A1 | 5/2007 | Gorobets |
| 2007/0101096 A1 | 5/2007 | Gorobets |
| 2021/0326069 A1 | 10/2021 | Ish |
| 2022/0057935 A1* | 2/2022 | Sheperek ............ G11C 11/5642 |

* cited by examiner

*Primary Examiner* — Kevin Verbrugge
(74) *Attorney, Agent, or Firm* — LOWENSTEIN SANDLER LLP

(57) ABSTRACT

A system including a memory device and a processing device, the processing device to identify a first temperature level of a first set of memory blocks associated with the memory device, and a second temperature level of a second set of memory blocks associated with the memory device, and determine that a condition is satisfied based on a comparison of the first temperature level, the second temperature level, and an adjustable threshold level. In response to the condition being satisfied, the processing device is to combine the first set of memory blocks and the second set of memory blocks to generate a combined set of memory blocks.

20 Claims, 7 Drawing Sheets

COMBINING SETS OF MEMORY BLOCKS IN A MEMORY DEVICE

CROSS-REFERENCE TO RELATED APPLICATION

This application is a continuation of U.S. patent application Ser. No. 17/103,441, titled "Temperature-based Block Family Combinations in a Memory Device," filed on Nov. 24, 2020, the entire disclosure of which is incorporated herein by reference.

TECHNICAL FIELD

Embodiments of the disclosure are generally related to memory sub-systems, and more specifically, are related to temperature-based block family combinations in a memory device.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

DETAILED DESCRIPTION

Figure 1:
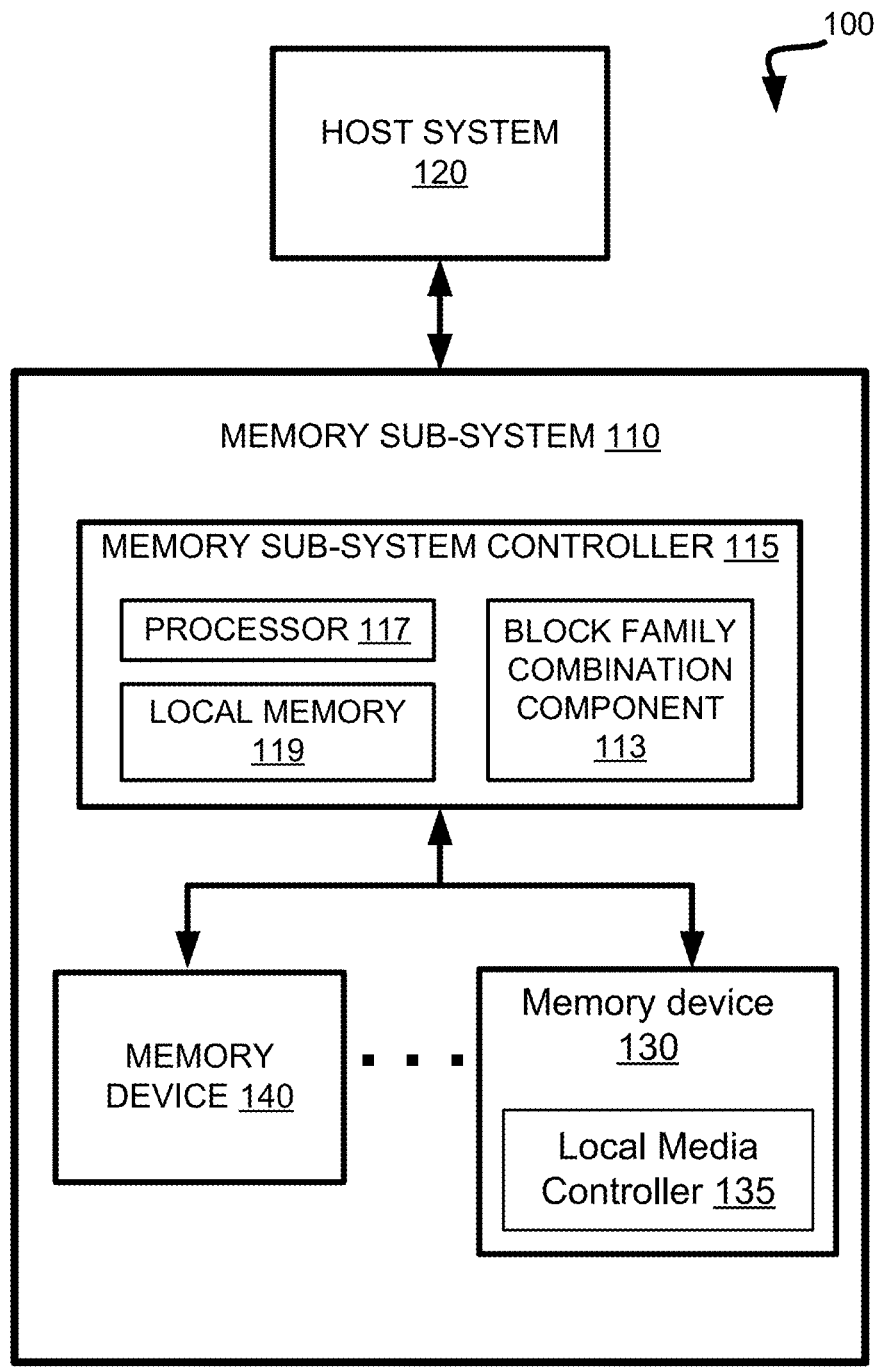
FIG. 1 illustrates an example computing system that includes a memory sub-system in accordance with some embodiments of the present disclosure.

Aspects of the present disclosure are directed to temperature-based block family combinations in a memory device of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

A memory device includes multiple memory cells, each of which can store, depending on the memory cell type, one or more bits of information. A memory cell can be programmed (written to) by applying a certain voltage to the memory cell, which results in an electric charge being held by the memory cell, thus allowing modulation of the voltage distributions produced by the memory cell. Moreover, precisely controlling the amount of the electric charge stored by the memory cell allows to establish multiple threshold voltage levels corresponding to different logical levels, thus effectively allowing a single memory cell to store multiple bits of information: a memory cell operated with $2^n$ different threshold voltage levels is capable of storing n bits of information. "Threshold voltage" herein shall refer to the voltage level that defines a boundary between two neighboring voltage distributions corresponding to two logical levels. Thus, the read operation can be performed by comparing the measured voltage exhibited by the memory cell to one or more reference voltage levels in order to distinguish between two logical levels for single-level cells and between multiple logical levels for multi-level cells.

Due to the phenomenon known as slow charge loss, the threshold voltage of a memory cell changes in time as the electric charge of the cell is degrading, which is referred to as "temporal voltage shift" (since the degrading electric charge causes the voltage distributions to shift along the voltage axis towards lower voltage levels). The threshold voltage is changing rapidly at first (immediately after the memory cell was programmed), and then slows down in an approximately logarithmic linear fashion with respect to the time elapsed since the cell programming event. Accordingly, failure to mitigate the temporal voltage shift caused by the slow charge loss can result in the increased bit error rate in read operations.

To more efficiently manage the memory device, a block family creation process can be executed to generate multiple block families that each include a set of a memory cells containing data that are expected to exhibit similar or related calibration changes with respect to time or temperature for at least a portion of the life of the written data. Block families can be created asynchronously with respect to block programming events. In an illustrative example, a new block family can be created whenever a specified period of time (e.g., a predetermined number of minutes) has elapsed since creation of the last block family or the reference temperature of memory cells has changed by more than a specified threshold value. The memory sub-system controller can maintain an identifier of the active block family, which is associated with one or more blocks as they are being programmed.

The memory sub-system controller can periodically perform a calibration process in order to associate each die of every block family with one of the predefined threshold voltage offset bins, which is in turn associated with the voltage offset to be applied for read operations. The associations of blocks with block families and block families and dies with threshold voltage offset bins can be stored in respective metadata tables maintained by the memory sub-system controller.

A memory sub-system has a limited amount of memory for storing the multiple block families, and as such, a limited number of block families can be maintained at a time. Therefore, conventional systems may combine block families that show similar voltage characteristics to reduce the number of block families in the memory device and reduce the effort required to manage, calibrate, and select bins (e.g., a set of read level offsets that are applied to asset of data) for each of the block families. However, combining block families based on voltage characteristics fails to take into account that data programmed at different temperatures exhibit voltage variation, even when read at a single temperature. As such, the block families are combined without considering the program temperature of the data being combined and the resulting block family combinations include program temperature related voltage differences within the same block family, resulting in worse calibration (e.g., altering a read level value (possibly by adjusting a read level offset or read level base) to better match the ideal read levels for a read or set of reads), higher error rates, and higher read retry trigger rates.

Aspects of the present disclosure address the above-identified and other deficiencies by implementing a memory sub-system that combines block families based on combination criteria that include the block family temperature levels. In an embodiment, the memory sub-system records or measures a temperature level of each block family and uses the identified temperature levels of multiple block families in determining whether to combine the multiple block families. In an embodiment, a program temperature level (e.g., an opening temperature recorded at a time a block family is opened, a closing temperature recorded at a time a block family is closed, a low temperature level during an open block tenure, a high temperature level during an open block tenure, an average of one or more of the aforementioned temperature levels, etc.) is identified for each block family. Advantageously, comparing temperature levels of the multiple block families to identify block family combinations enables the memory sub-system to overcome issues associated with temperature compensation miscalibrations and associated voltage variations within a block family. In addition, combining multiple block families addresses the constraints on the available memory space allocated for storing block families and associated metadata. In this regard, combining multiple block families frees up memory for storing new block families.

Therefore, advantages of the systems and methods implemented in accordance with some aspects of the present disclosure include, but are not limited to, improving the bit error rate in read operations by maintaining metadata tracking groups of blocks (block families) that are presumed to exhibit similar voltage distributions and selectively performing calibration operations for limited subsets of blocks based on their block family association, as described in more detail herein below.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical block address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a block family combination component 113 that can be used to implement block family combination criteria in accordance with embodiments of the present disclosure. In some embodiments, the controller 115 includes at least a portion of the block family combination component 113. For example, the controller 115 can include a processor 117 (processing device) configured to execute instructions stored in local memory 119 for performing the operations described herein. In some embodiments, the block family combination component 113 is part of the host system 120, an application, or an operating system. The block family combination component 113 can manage block families associated with the memory devices 130, as described in more detail herein below.

Figure 2:
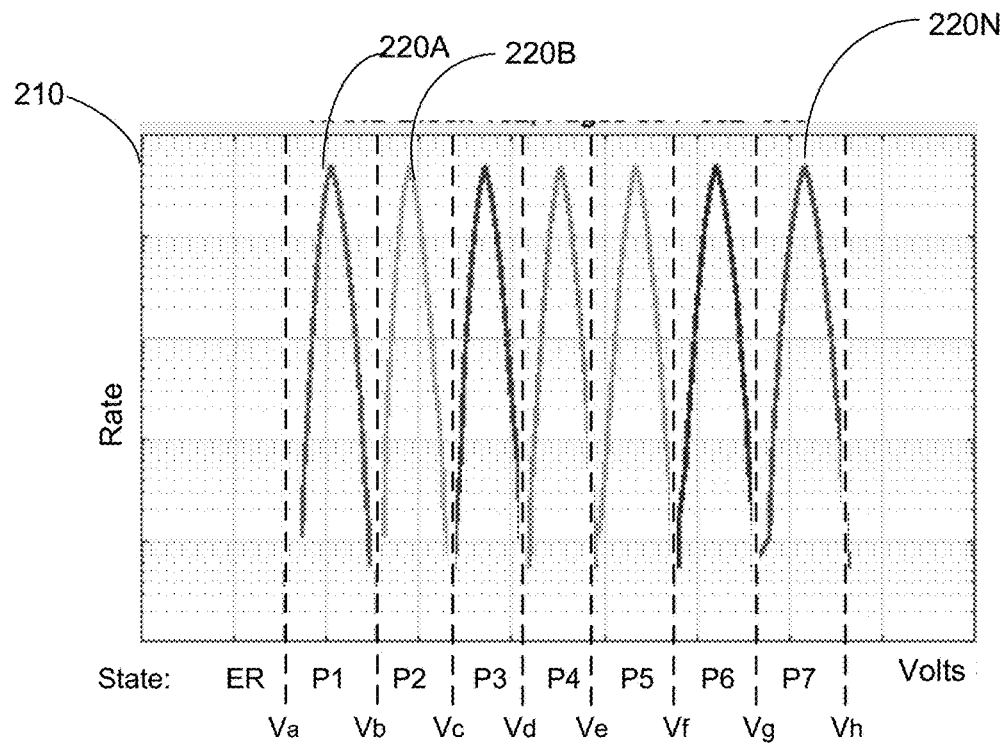
FIG. 2 schematically illustrates the temporal voltage shift caused by the slow charge loss exhibited by triple-level memory cells, in accordance with embodiments of the present disclosure.
Figure 2:
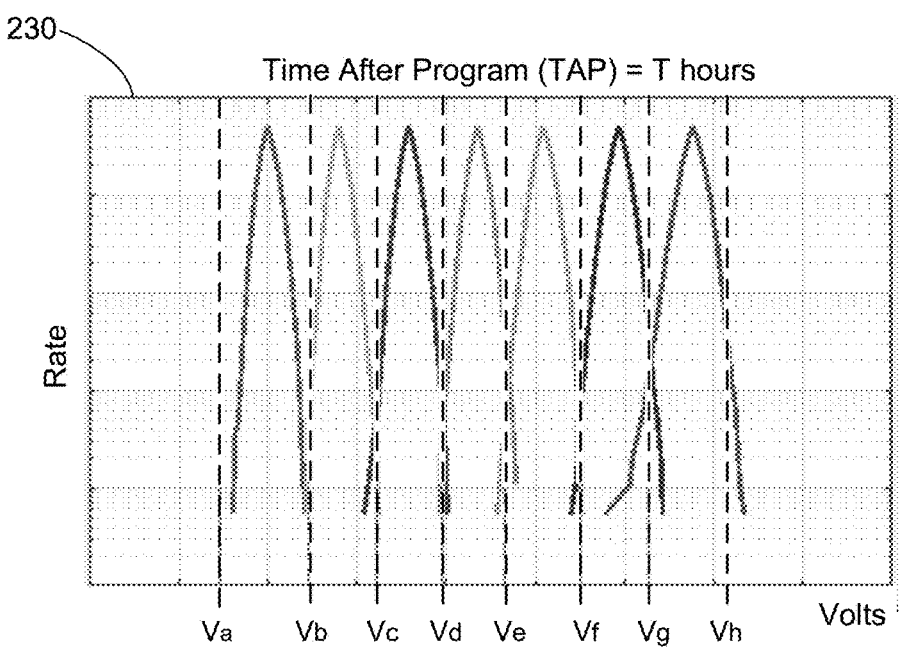

FIG. 2 schematically illustrates the temporal voltage shift caused by the slow charge loss exhibited by triple-level memory cells. While the illustrative example of FIG. 2 utilizes triple-level cells, the same observations can be made and, accordingly, the same remedial measures are applicable to single level cells and multi-level cells in order to compensate for the slow charge loss.

As noted herein above, a memory cell can be programmed (written to) by applying a certain voltage to the memory cell, which results in an electric charge being held by the memory cell, thus allowing modulation of the voltage distributions produced by the memory cell. Precisely controlling the amount of the electric charge stored by the memory cell allows to establish multiple threshold voltage levels corresponding to different logical levels, thus effectively allowing a single memory cell to store multiple bits of information: a memory cell operated with 2n different threshold voltage levels is capable of storing n bits of information.

Each of chart 210 and 230 illustrate program voltage distributions 220A-220N (also referred to as "program distributions" or "voltage distributions" or "distributions" herein) of memory cells programmed by a respective write level (which can be assumed to be at the midpoint of the program distribution) to encode a corresponding logical level ("000" through "111" in case of a TLC). The program distributions 220A through 220N can illustrate the range of threshold voltages (e.g., normal distribution of threshold voltages) for memory cells programmed at respective write levels (e.g., program voltages). In order to distinguish between adjacent program distributions (corresponding to two different logical levels), the read threshold voltage levels (shown by dashed vertical lines) are defined, such that any measured voltage that falls below a read threshold level is associated with one program distribution of the pair of adjacent program distributions, while any measured voltage that is greater than or equal to the read threshold level is associated with another program distribution of the pair of neighboring distributions.

In chart 210, eight states of the memory cell are shown below corresponding program distributions (except for the state labeled ER, which is an erased state, for which a distribution is not shown). Each state corresponds to a logical value. The threshold voltage levels are labeled Va-Vh. As shown, the ER state has a corresponding level of 111, and any measured voltage below Va is associated with the ER state. The states labeled P1, P2, P3, P4, P5, P6, and P7 correspond to distributions 220A-220N.

Time After Program (TAP) herein shall refer to the time since a cell has been written and is the primary driver of TVS (temporal voltage shift). TAP can be estimated (e.g., inference from a data state metric), or directly measured (e.g., from a controller clock). A cell, block, page, block family, etc. is young (or, comparatively, younger) if it has a (relatively) small TAP and is old (or, comparatively, older) if it has a (relatively) large TAP. A time slice is a duration between two TAP points during which a measurement can be made (e.g., perform reference calibration from 8 to 12 minutes after program). A time slice can be referenced by its center point (e.g., 10 minutes).

As seen from comparing example charts 210 and 230, which reflect the time after programming (TAP) of 0 (immediately after programming) and the TAP of T hours, respectively, the program distributions change over time due primarily to slow charge loss. In order to reduce the read bit error rate, the corresponding read threshold voltages are adjusted to compensate for the shift in program distributions, which are shown by dashed vertical lines. In various embodiments of the disclosure, the temporal voltage shift is selectively tracked for die groups based on measurements performed at one or more representative dice of the die group. Based on the measurements made on representative dice of a die group that characterize the temporal voltage shift and operational temperature of the dice of the die group, the read threshold voltage offsets used to read the memory cells for the dice of the die group are updated and are applied to the base read threshold levels to perform read operations.

Figure 3:
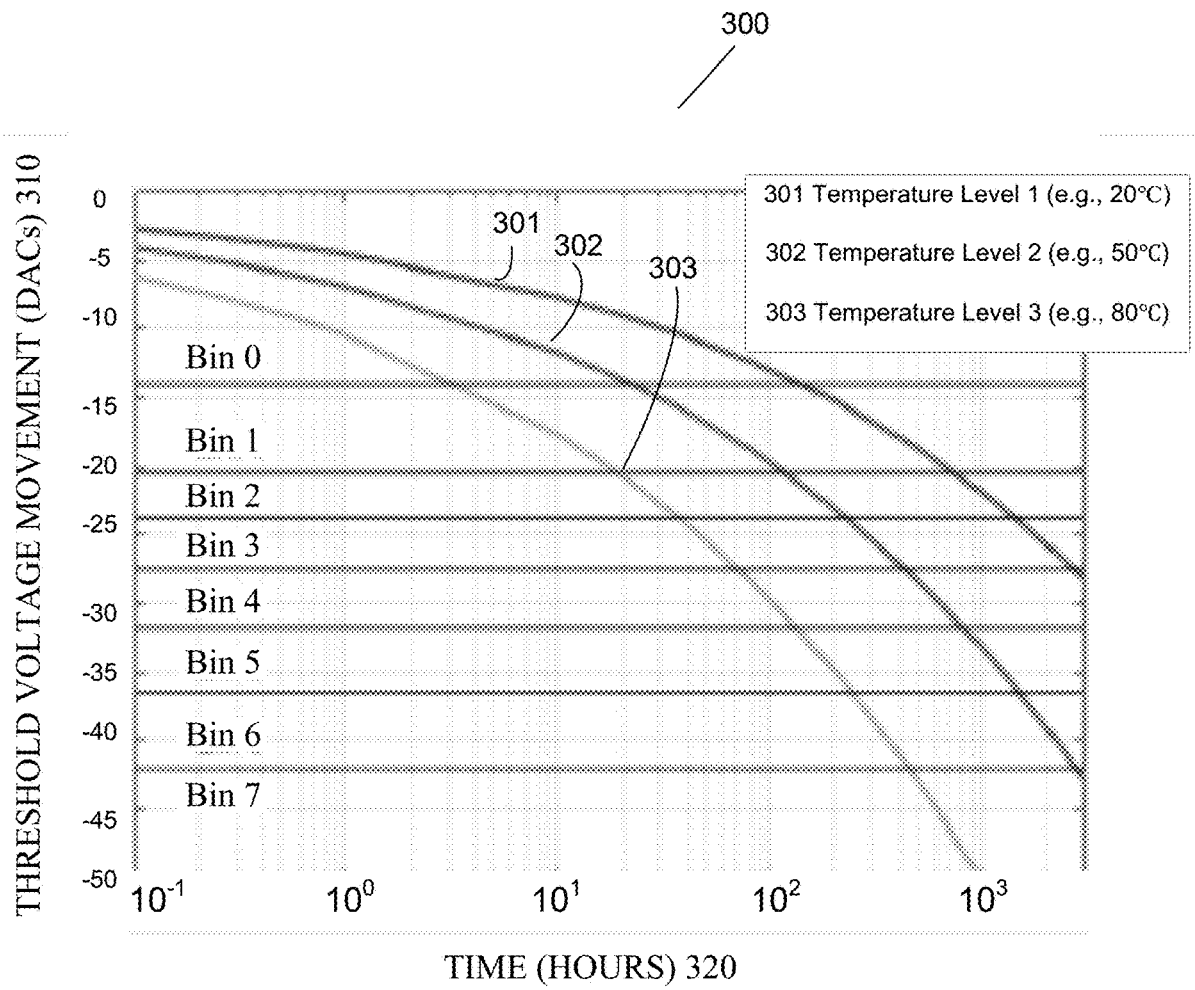
FIG. 3 depicts an example graph illustrating the dependency of the threshold voltage offset on a program temperature associated with a block family, in accordance with embodiments of the present disclosure.

FIG. 3 depicts an example graph 300 illustrating a relationship between the variation in threshold voltage offset 310 over time after program 320 (i.e., the period of time elapsed since the block had been programmed) and a temperature level associated with the memory device. As illustrated in FIG. 3, blocks of the memory device are grouped into block families, such that each block family includes one or more blocks that have been programmed within a specified temperature window. For example, as shown in FIG. 3, the memory device can include a first block family having blocks programmed at a first temperature level 301, a second block family having blocks programmed at a second temperature level 302, and a third block family having blocks programmed at a third temperature level 303. As shown, the different temperature levels associated with the programmed data of the block family is a factor affecting the temporal voltage shift, such that all blocks and/or partitions within a single block family programmed at a same temperature level 301, 302, 303 are presumed to exhibit similar distributions of threshold voltages in memory cells, and thus would require the same voltage offsets for read operations.

Block families can be created asynchronously with respect to block programming events. In an illustrative example, the memory sub-system controller 115 of FIG. 1 can create a new block family whenever a specified period of time (e.g., a predetermined number of minutes) has elapsed since creation of the last block family or whenever the reference temperature of memory cells, which is updated at specified time intervals, has changed by more than a specified threshold value since creation of the current block family.

A newly created block family can be associated with bin 0. Then, the memory sub-system controller can periodically perform a calibration process in order to associate each die of every block family with one of the predefined threshold voltage offset bins, which is in turn associated with the voltage offset to be applied for read operations. The associations of blocks with block families and block families and dies with threshold voltage offset bins can be stored in respective metadata tables maintained by the memory sub-system controller. In an embodiment, the block family combination component can record a temperature level associated with each block family. The temperature level can be a program temperature associated with the block family. For example, the temperature level can be an average program temperature difference across all memory dies of the block family. In another example, the temperature level can be an average program temperature across one memory die per memory package. In another example, the temperature level can be an average program temperature difference across a maximum temperature difference of a block family. In another example, the temperature level can be an average program temperature difference based on N number of die in the memory device. In this example, if a memory sub-system includes 32 memory dies, rather than using the average program temperature difference of all 32 memory dies, the N number of memory dies (e.g., 6 memory dies) with the largest temperature difference are averaged together.

Figure 4:
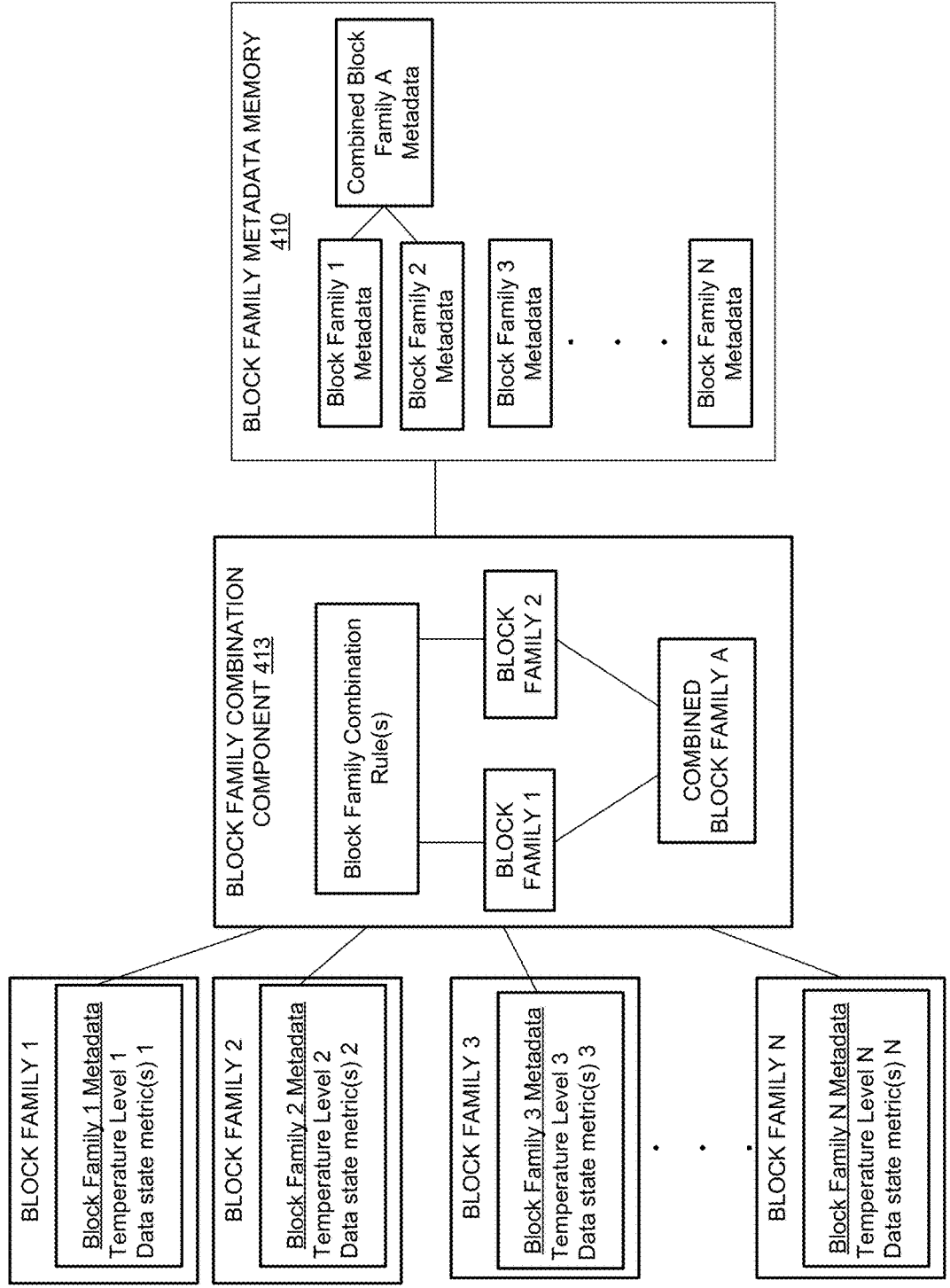
FIG. 4 illustrates an example block family combination component and block family metadata memory, in accordance with embodiments of the present disclosure.

FIG. 4 schematically illustrates block family combination operations implemented by the block family combination component (e.g., block family combination component 113 of FIG. 1) of the memory-sub-system controller operating in accordance with embodiments of the present disclosure. As schematically illustrated in FIG. 4, the block family combination component 413 can manage a memory or data store (e.g., block family metadata memory 410 of FIG. 4) configured to store metadata associated with multiple block families (e.g., block family 1, block family 2, block family 3 . . . block family N) and one or more combined block families (e.g., combine block family A). In an embodiment, the block family metadata memory 410 has a limited or fixed storage capacity and is able to store information for a maximum number of block families (e.g., 64 block families). In an embodiment, the block family combination component 413 manages the available storage of the block family metadata memory 410 by generating one or more combined block families based on one or more block family combination rules or criteria. In an embodiment, the block family combination rules can include a comparison of temperature levels of multiple block families (e.g., a first block family and a second block family) to determine whether to generate a combined block family.

In an embodiment, the block family combination component 413 record metadata associated with each of the block families. In an embodiment, the metadata can include a temperature level associated with a block family. The temperature level can be a program temperature associated with the block family. In an embodiment, the program temperature can be an opening temperature (e.g., a program temperature at a time the block family is opened), a closing temperature (e.g., a program temperature at a time the block family is closed), a low (or minimum) program temperature during an open block tenure of the block family, a high (or maximum) program temperature during an open block tenure of the block family, or a combination of the aforementioned program temperatures (e.g., an average or integrated value corresponding to program temperatures of the block family).

In an embodiment, the metadata can further include data state metrics associated with the block family. In an embodiment, a data state metric is a quantity that is measured or inferred from the behavior of data within the drive that generally provides insight into the voltage state of that data. In an embodiment, the data state metrics may indicate the state of the temporal voltage shift, a state of temperature compensation miscalibration, a degree of read disturb, or other operating parameter. The act of making the measurement is a data state measurement. A data state metric may indicate the bin to which data is to be assigned, the location of that bin, the state of the temporal voltage shift. In an embodiment, the metadata can include a composite data state metric, which is a data state metric which is some function of a set of component state metrics. For example, one possible composite state metric is the read level 7 offset+½ the read level 6 offset−2*read level 2 offset.

In an embodiment, the block family combination rule can include determining a difference between a first temperature level of a first block family and a second temperature level of a second block family (also referred to as a "program temperature difference"). The program temperature difference can be compared to a threshold level (also referred to as a "program temperature difference threshold level") to determine if a condition is satisfied. In an embodiment, the condition is satisfied if the program temperature difference is less than the threshold level. In an embodiment, the threshold level is a predetermined or preset temperature value (e.g., 10° C., 20° C., etc.) for use in identifying multiple block families that have a same or similar program temperature and using that criteria in the block family combination process. In an embodiment, the combined block family A metadata can indicate that the program temperature of the resultant combined block family A is an average of the first temperature level (e.g., a program temperature of block family 1) and the second temperature level (e.g., a program temperature of block family 2).

In an embodiment, the block family combination rule can be based on a program temperature threshold level that can be adjusted in view of an operating parameter of the memory sub-system. In an embodiment, the operating parameter can be an amount of available storage in the block family metadata memory 410. In an embodiment, the block family combination component 413 can determine whether the memory device is running out of available storage space in the block family metadata memory 410 for storing new block families and adjust the threshold value used for comparing the program temperature difference between two block families. In an embodiment, the block family combination component 413 can compare the operating parameter (e.g., a level of available memory for storing block families) to a corresponding threshold level (e.g., a minimum level of available memory) to determine if a condition is satisfied. In this embodiment, the condition is satisfied if the level of available memory is less than or below the minimum level of available memory (e.g., this condition is also referred to as a "desperation" state since the memory sub-system is running low on available memory for storing block families). In this embodiment, if the condition is satisfied, the block family combination component 413 can adjust the program temperature difference threshold level (e.g., the program temperature difference threshold level can be increased from 10° C. to 20° C.) to enable block families with a larger program temperature difference to be combined when the memory sub-system is in a desperation state.

For example, the block family combination component 413 can apply a block family combination rule that enables block families to be combined when the identified program temperature difference is 20° C. or less when in a desperation state (e.g., the available memory in the block family metadata memory 410 is less than a threshold level), and enables block families to be combined when the identified program temperature difference is 10° C. or less when the available memory in the block family metadata memory 410 is less than the threshold level.

In an embodiment, the operating parameter can be a cycle count (e.g., a program/erase cycle (PEC) count) of the memory sub-system. In this embodiment, the block family combination component 413 can adjust the program temperature threshold level based on an identified cycle count. For example, if the PEC count is above a threshold cycle count level, the block family combination component 413 can lower the program temperature threshold level (i.e., requiring the program temperature difference to be smaller when the PEC count is higher in order to enable a combination).

In an embodiment, the block family combination rule can include determining a first temperature level of a first block family and a second temperature level of a second block family. In this embodiment, the block family combination rule can refer to a data structure (e.g., a table) including multiple temperature ranges (e.g., each range having a minimum temperature value and a maximum temperature value). For example, ranges can include a first range of 0° C. to 30° C., a second range of 31° C. to 60° C., and a third range of 61° C. to 90° C. In this embodiment, block family combination rule can enable the combination of the first block family and the second block family if the first temperature level and the second temperature level fall within the same range. In this embodiment, if the identified temperature levels associated with the block families fall within different ranges, then the block family combination component 413 can determine that the block families are not to be combined.

In an embodiment, the temperature level associated with a block family can include a low program temperature and a high program temperature for each block family (identified and stored at any granularity including by die, by package, by memory device). In this embodiment, the block family combination rule can be based on a total range of the temperature levels for the two block families, by a mean temperature difference, or any other statistic based on the two temperatures. In an example, the combined block family (e.g., combined block family A representing a combination of block family 1 and block family 2, as shown in FIG. 4) can adopt the combined range of the two component block families. For example, if block family 1 had a low-to-high program temperature range of 20° C. to 30° C. and block family 2 had a low-to-high program temperature range of 25° C. to 40° C. block family would result in the combined block family A having a 20° C. to 40° C. temperature range.

In an embodiment, the block family combination rule can determine whether to combine block families based on a consideration of the program temperature difference and one or more data state metrics. In this embodiment, the metadata for each block family includes the temperature level and the data state metrics, as shown in FIG. 4. In this embodiment, the block family combination rule can incorporate the program temperature criteria with other block family combination criteria based on the data state metrics. For example, the block family combination rule can enable block family combinations when the program temperature difference is above a threshold level and the data state metric varies by a small amount (e.g., a difference between the respective data state metrics is less than a corresponding threshold level (e.g., a data state metrics threshold level). In this example, the block family combination rule can enable block family combinations when the program temperature difference is below a threshold level and the data state metric varies by a large amount (e.g., the difference between the respective data state metrics is greater than the data state metrics threshold level.

Figure 5:
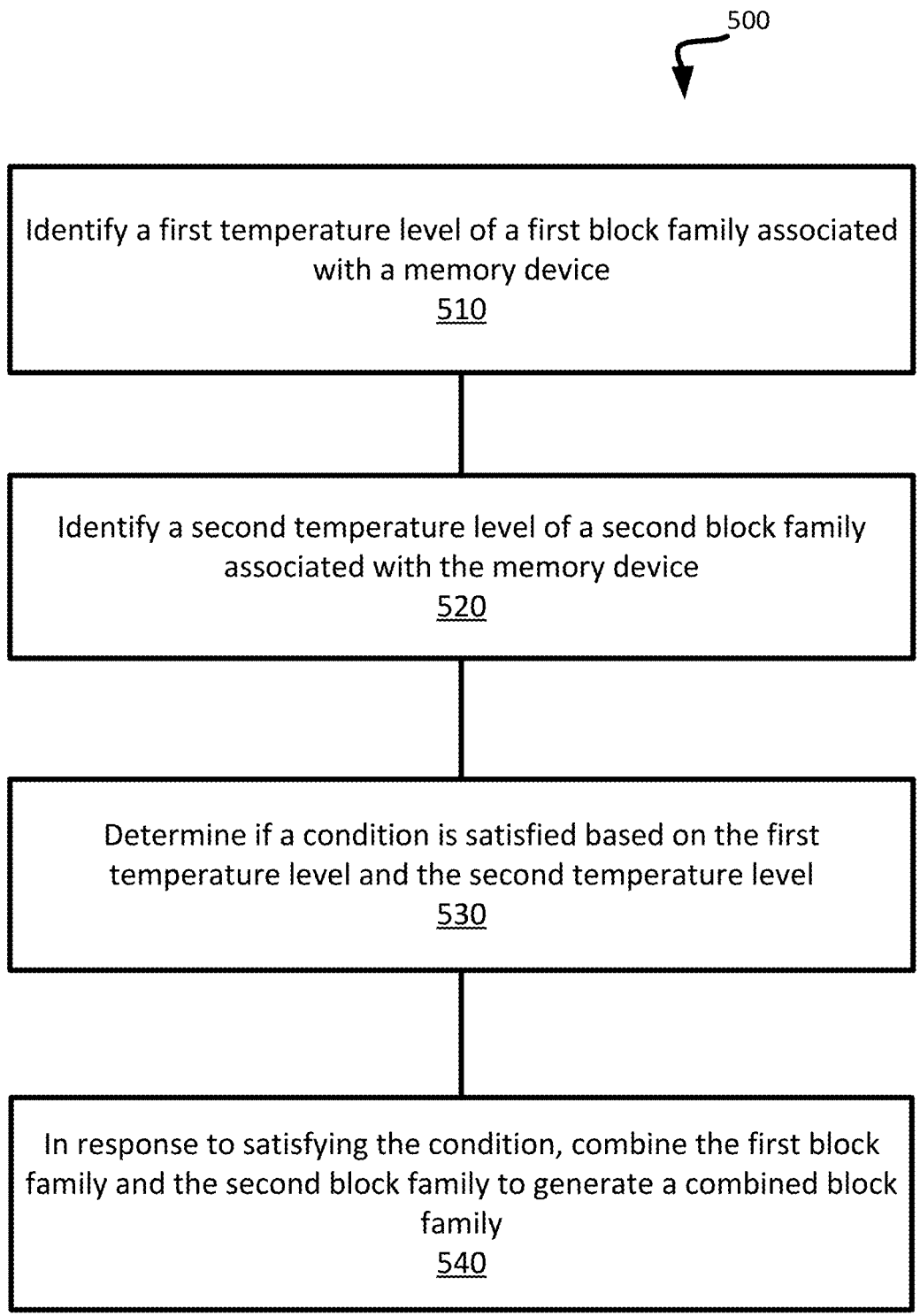
FIG. 5 is a flow diagram of an example method 500 of block family combination management implemented by a memory sub-system controller operating in accordance with embodiments of the present disclosure.

FIG. 5 is a flow diagram of an example method 500 of block family combination management implemented by a memory sub-system controller operating in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the block family combination component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

In operation 510, the processing logic (e.g., a processing device of the block family combination component 113 of FIG. 1) identifies a first temperature level of a first block family associated with a memory device. As described in detail above, the first temperature level can be a program temperature associated with the first block family. For example, the first temperature level can be an opening temperature recorded at a time a block family is opened, a closing temperature recorded at a time a block family is closed, a low temperature level during an open block tenure, a high temperature level during an open block tenure, an average of one or more of the aforementioned temperature levels, etc.)

In operation 520, the processing logic identifies a second temperature level of a second block family associated with the memory device. As described above in connection with operation 520, the second temperature level can be a program temperature associated with the second block family. For example, the second temperature level can be an opening temperature recorded at a time a block family is opened, a closing temperature recorded at a time a block family is closed, a low temperature level during an open block tenure, a high temperature level during an open block tenure, an average of one or more of the aforementioned temperature levels, etc.)

In operation 530, the processing logic determines if a condition is satisfied based on the first temperature level and the second temperature level. In an embodiment, the condition is satisfied if a difference between the first temperature level and the second temperature level is less than a threshold level.

In another embodiment, the condition is satisfied if the first temperature level and the second temperature level both fall within a same temperature range. In this embodiment, the processing logic can maintain multiple temperature ranges (e.g., a first range of 0° C. to 30° C., a second range of 31° C. to 60° C., and a third range of 61° C. to 90° C.). In operation 530, the processing logic can determine which range of the multiple ranges each of the first temperature level and the second temperature levels falls within. In response to determining the first temperature level and the second temperature level are within the same range, the processing logic determines the condition is satisfied.

In operation 540, in response to satisfying the condition, the processing logic combines the first block family and the second block family to generate a combined block family. In an embodiment, metadata associated with the combined block family can be stored in a data store configured to store the block family metadata (e.g., the block family metadata memory 410 of FIG. 4). In an embodiment, the metadata associated with the combined block family can reflect a low-to-high temperature range representative of the low-to-high temperature range of the respective block families. For example, if the first block family had a low-to-high program temperature range of 32° C. to 57° C. and the second block family had a low-to-high program temperature range of 34° C. to 51° C., the combined block family can be identified as having a 32° C. to 57° C. temperature range.

Figure 6:
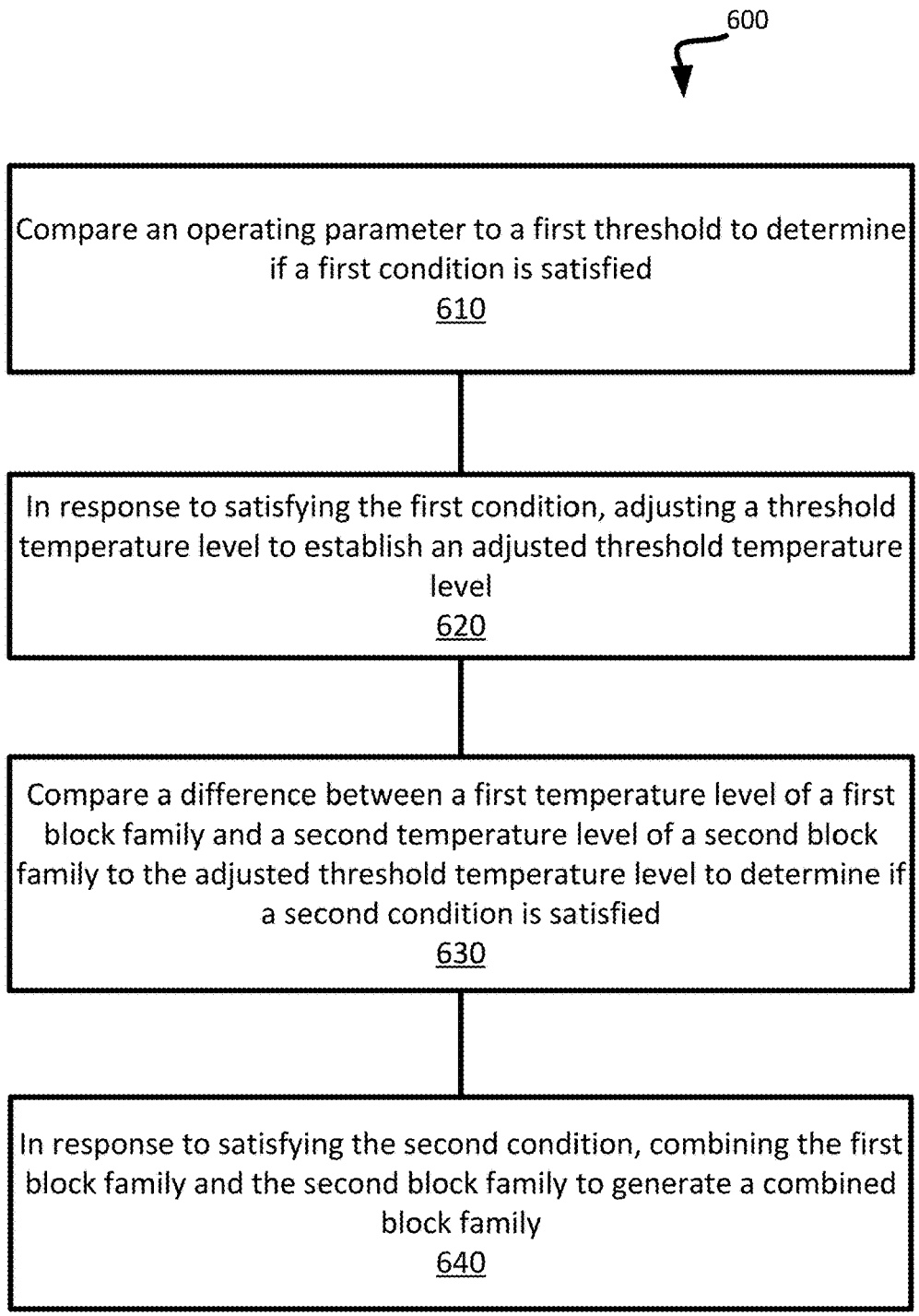
FIG. 6 is a flow diagram of an example method 600 of block family combination management implemented by a memory sub-system controller operating in accordance with embodiments of the present disclosure.

FIG. 6 is a flow diagram of an example method of generating a combined block family based on program temperature levels and one or more operating parameters of a memory sub-system in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the block family combination component 113 of FIG. 1 or the block family combination component 413 of FIG. 4. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

In operation 610, the processing logic compares an operating parameter to a first threshold to determine if a first condition is satisfied. In an embodiment, the operating parameter can be a difference between a first data state metric of a first block family and a second data state metric of a second block family. In this embodiment, the first condition is satisfied if the difference between the data state metrics is greater than a threshold data state metric level (i.e., the first threshold level). For example, the data state metrics (e.g., an amount of charge) of the respective block families may vary by a large amount (e.g., more than the threshold data state metric level), and therefore, satisfy the first condition.

In an embodiment, the operating parameter can be a level of available memory for storing block families. In this embodiment, the first condition is satisfied if the level of available memory is below a threshold available memory level (i.e., the first threshold level). In an embodiment, the threshold available memory level is a predetermined or selected amount of available memory used to define when the memory device is operating in a desperation state. In this embodiment, the first condition is satisfied when the memory device is operating in the desperation state (i.e., the amount of available memory is below the threshold available memory level).

In an embodiment, the operating parameter can be a cycle count of the memory device. In this embodiment, the first condition is satisfied if the cycle count is above a threshold cycle count level (e.g., a predetermined or selected number of cycles).

In operation 620, in response to satisfying the first condition, the processing logic adjusts a threshold temperature level to establish an adjusted threshold temperature level. In embodiments, the adjustment to the threshold temperature level can be an increase or a decrease of an initial or current threshold temperature level, depending on the first condition that is satisfied. In an embodiment, the processing logic lowers or decreases the threshold temperature level in response to the satisfaction of a first condition indicating the difference between the data state metrics of the first block family and the second block family is greater than a threshold data state metric level. In an embodiment, the processing logic lowers or decreases the threshold temperature level in response to the satisfaction of a first condition indicating a current cycle count is above the threshold cycle count level. By decreasing the threshold temperature level, the processing logic can enable fewer combinations of block families by lowering the acceptable program temperature difference between candidate block families, as described below.

In an embodiment, the processing logic raises or increases the threshold temperature level in response to the satisfaction of a first condition indicating the amount of available memory for storing block families is below the threshold available memory level. By increasing the threshold temperature level, the processing logic can enable the combination of block families having a larger program temperature difference, as described below.

In operation 630, the processing logic compares a difference between a first temperature level of a first block family and a second temperature level of a second block family to the adjusted threshold temperature level to determine if a second condition is satisfied. In an embodiment, the processing logic uses the threshold temperature level as adjusted in operation 620 for comparison purposes to determine if the second condition is satisfied. In an embodiment, the second condition is satisfied if the difference between the first temperature level of the first block family and the second temperature level of the second block family is less than the threshold temperature level.

In operation 640, in response to satisfying the second condition, the processing logic combines the first block family and the second block family to generate a combined block family. In an embodiment, the determination whether to combine the first block family and the second block family is a function of the first condition (e.g., the condition associated with the operating parameter (e.g., the available memory, the data state metrics difference, the cycle count, etc.) and the second condition (e.g., the condition associated with the program temperature difference between the two block families).

Figure 7:
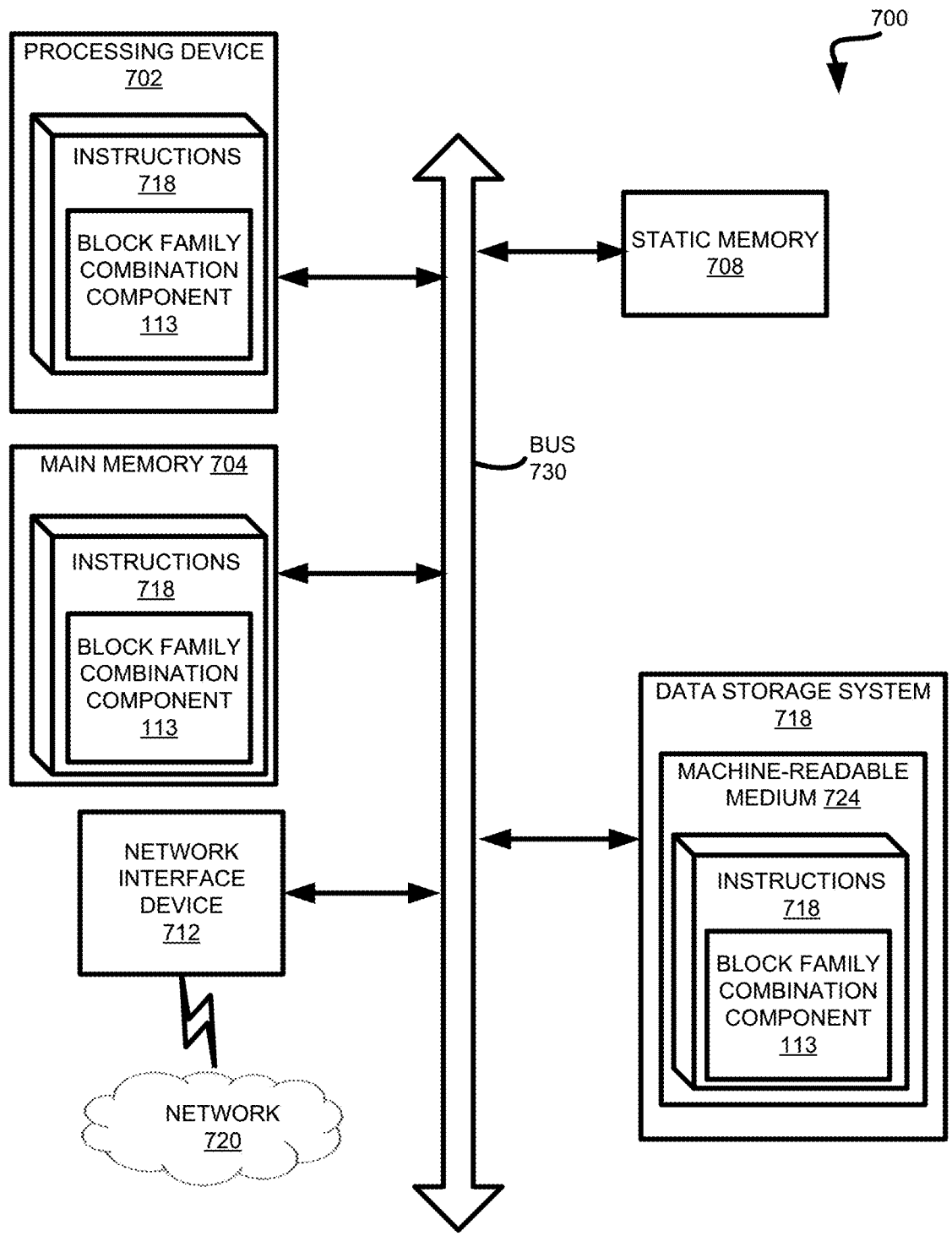
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the block family combination component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 710 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 728 for performing the operations and steps discussed herein. The computer system 700 can further include a network interface device 712 to communicate over the network 720.

The data storage system 718 can include a machine-readable storage medium 724 (also known as a computer-readable medium) on which is stored one or more sets of instructions 728 or software embodying any one or more of the methodologies or functions described herein. The instructions 728 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 728 include instructions to implement functionality corresponding to the block family combination component 113 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, the processing device to:
identify a first temperature level of a first set of memory blocks associated with the memory device;
identify a second temperature level of a second set of memory blocks associated with the memory device;
determine that a condition is satisfied based on a comparison of the first temperature level, the second temperature level, and an adjustable threshold level; and
in response to the condition being satisfied, combine the first set of memory blocks and the second set of memory blocks to generate a combined set of memory blocks.

2. The system of claim 1, the processing device further to determine an operating characteristic associated with the memory device.

3. The system of claim 2, the processing device to determine that a further condition is satisfied based on a comparison of the operating characteristic and an operating characteristic threshold.

4. The system of claim 3, the processing device to, in response to the further condition being satisfied, adjust the adjustable threshold level.

5. The system of claim 2, wherein the operating characteristic comprises a level of available memory for storing of one or more sets of memory blocks.

6. The system of claim 1, wherein the first temperature level comprises one of a program temperature associated with an opening of the first set of memory blocks, a program temperature associated with a closing of the first set of memory blocks, a lowest program temperature identified during a period when the first set of memory blocks is open, or a highest program temperature identified during the period when the first set of memory blocks is open.

7. The system of claim 1, wherein the condition is satisfied upon determining that a difference between the first temperature level and the second temperature level is less than the adjustable threshold level.

8. A method comprising:
comparing, by a processing device, a difference between a first temperature level associated with a first set of blocks of a memory device and a second temperature level associated with a second set of blocks of the memory device to a threshold level to determine if a condition is satisfied; and
in response to the condition being satisfied, combining the first set of memory blocks and the second set of memory blocks to generate a combined set of memory blocks.

9. The method of claim 8, further comprising:
comparing an operating parameter to a further threshold to determine if a further condition is satisfied; and
in response to the further condition being satisfied, adjusting the threshold level to establish an adjusted threshold level.

10. The method of claim 9, wherein the operating parameter comprises a first metric associated with the first set of memory blocks and a second metric associated with the second set of memory blocks.

11. The method of claim 9, wherein the operating parameter is an amount of available memory to store data associated with one or more sets of memory blocks.

12. The method of claim 8, wherein the condition is satisfied upon determining that a difference between the first temperature level and the second temperature level is less than the threshold level.

13. The method of claim 12, further comprising decreasing the threshold level.

14. A non-transitory computer readable medium comprising instructions, which when executed by a processing device, cause the processing device to perform operations comprising:
identifying a first temperature level of a first set of memory blocks associated with a memory device;
identifying a second temperature level of a second set of memory blocks associated with the memory device;
determining that a condition is satisfied based on a comparison of the first temperature level, the second temperature level, and an adjustable threshold level; and
in response to the condition being satisfied, combining the first set of memory blocks and the second set of memory blocks to generate a combined set of memory blocks.

15. The non-transitory computer readable medium of claim 14, the operations further comprising determining an operating characteristic associated with the memory device.

16. The non-transitory computer readable medium of claim 15, the operations further comprising determining that a further condition is satisfied based on a comparison of the operating characteristic and an operating characteristic threshold.

17. The non-transitory computer readable medium of claim 16, the operations further comprising, in response to the further condition being satisfied, adjusting the adjustable threshold level.

18. The non-transitory computer readable medium of claim 15, wherein the operating characteristic comprises a level of available memory for storing of one or more sets of memory blocks.

19. The non-transitory computer readable medium of claim 14, wherein the first temperature level comprises one of a program temperature associated with an opening of the first set of memory blocks, a program temperature associated with a closing of the first set of memory blocks, a lowest program temperature identified during a period when the first set of memory blocks is open, or a highest program temperature identified during the period when the first set of memory blocks is open.

20. The non-transitory computer readable medium of claim 14, wherein the condition is satisfied upon determining that a difference between the first temperature level and the second temperature level is less than the adjustable threshold level.

* * * * *